United States Patent [19]
Gupta et al.

[11] Patent Number: 5,357,564
[45] Date of Patent: Oct. 18, 1994

[54] INTELLIGENT CALL SCREENING IN A VIRTUAL COMMUNICATIONS NETWORK

[75] Inventors: Alok K. Gupta, Marlboro; Monowar Hossain, Middletown; Paramdeep S. Sahni, Marlboro, all of N.J.

[73] Assignee: AT&T Bell Laboratories, Murray Hill, N.J.

[21] Appl. No.: 929,876

[22] Filed: Aug. 12, 1992

[51] Int. Cl.$^5$ ............................................. H04M 1/66
[52] U.S. Cl. .................................... 379/188; 379/196; 379/207; 379/95; 379/112
[58] Field of Search ............... 379/196, 197, 188, 207, 379/220, 221, 95, 145, 199, 200, 112

[56] References Cited

U.S. PATENT DOCUMENTS

| | | | |
|---|---|---|---|
| 4,756,020 | 7/1988 | Fodale | 379/197 |
| 4,845,739 | 7/1989 | Katz | 379/93 |
| 4,926,470 | 5/1990 | Sanford | 379/199 |

OTHER PUBLICATIONS

Pierce et al., "Meeting Private Needs with the Public Network," Bellcore Exchange, Jan./Feb. 1988, pp. 8-13.
Brosemer et al., "Virtual Networks: Past, Present and Future," IEEE Communications Magazine, Mar. 1992, pp. 80-85.
Shaye, "Private Interconnect Networks Overview," The National Telecommunication Conference, New Orleans 1981 pp. 1-8.

*Primary Examiner*—James L. Dwyer
*Assistant Examiner*—Daniel S. Hunter
*Attorney, Agent, or Firm*—Barry H. Freedman

[57] ABSTRACT

A unified and systematic approach is taken both to design of a virtual communications network within a carrier's telecommunications network, and to design the screening filters provided in the VCN data base which control the admission of calls to the network. For this purpose, telecommunications traffic information that is relevant for both the design of the VCN architecture as well as for development of the screening filters is aggregated and applied both to a network design tool that is used to generate the customer's virtual network configuration, as well as to a screening filter generator (SFG). The traffic information may include, for example, traffic data contained in network and customer premises equipment call detail records and billing data. In one embodiment, the SFG also receives output information from the network design tool, indicative of the on-net and off-net locations in the VCN, and information from a carrier data base that provides a weighting factor indicative of the incidence of fraudulent calling to different domestic and international destinations. The SFG is arranged to jointly process the traffic information as well as the fraudulent calling information (together with information relating to VCN design parameters, if desired) in order to generate screening filters that can be installed, and thereafter used, in the VCN to determine, on a call by call basis, whether a call made using the VCN is allowed or denied. Advantageously, the screening filters are designed so that they will minimize or reduce the possibility that the VCN will be used to make fraudulent calls.

24 Claims, 11 Drawing Sheets

| FRAUDULENT LOCATION | WEIGHTING FACTOR "F" |
|---|---|
| ⋮ | ⋮ |
| FRANCE | 0.05 |
| ⋮ | ⋮ |
| PAKISTAN | 0.57 |
| ⋮ | ⋮ |
| PANAMA | 0.81 |
| ⋮ | ⋮ |

FIG. 6

| NETWORK ELEMENT CHARACTERISTIC | VALUE |
|---|---|
| MAXIMUM # OF LOCATIONS THAT CAN BE INCLUDED IN SCREENING FILTER | 250 |
| MAXIMUM # OF STATION GROUPS THAT CAN BE CONFIGURED | 200 |
| MAXIMUM # OF CODE GROUPS THAT CAN BE CONFIGURED | 200 |
| TIME OF DAY/DAY OF WEEK LIMITATIONS | NONE |
| ○<br>○<br>○<br>○ | ○<br>○<br>○<br>○ |

610 620

| SCREENING FILTER FOR ORIGINATING LOCATION X | | |
|---|---|---|
| 901 | 902 | 903 |
| DESTINATION | STATUS | CONSTRAINTS |
| FRANCE | ALLOW | |
| PANAMA | DENY | |
| PAKISTAN | CONSTRAINED | 3 CALLS/HOUR |

INTELLIGENT CALL SCREENING IN A VIRTUAL COMMUNICATIONS NETWORK

FIELD OF THE INVENTION

This invention relates generally to virtual communications networks (VCN's) which are arranged to provide "private", custom designed telecommunications features and services to customers using a public switched telecommunications network, and, in particular, to a system for providing intelligent call screening in the context of a VCN that will substantially reduce the incidence of fraudulent calls.

BACKGROUND OF THE INVENTION

A virtual communications network (VCN) is a custom designed "private" telecommunications network typically offered by an interexchange carrier such as AT&T (or by local exchange carriers or international carriers) to large business customers who require inter-premises voice and data communications. Customers can directly access the VCN from customer premises equipment such as terminals connected to the customers' PBX, via private lines or switched connections using local exchange carriers. They can also remotely access the VCN, e.g., from stations that originate a call to the PBX from an "off-net" location and then are connected to the VCN via a second connection originated in the PBX. Each customer is allocated virtual resources within the carrier's network, based upon the customer's expected calling patterns and historical communications needs.

A VCN typically includes one or more data bases that associate information provided by the caller (such as the caller's telephone number) with stored information in the data base, in order to determine how the call is to be routed and treated. Ones of these data bases can also serve as "screening filters" in order to allow or deny each call based on predetermined screening instructions. Filtering may include various fraud prevention schemes, requiring entry of personal identification numbers (PINs), passwords or other identifiers, so as to eliminate or reduce the occasions when the VCN is used as a gateway into the interexchange network by hackers or other unauthorized callers. Additionally, filtering may restrict access through the VCN to particular destinations under particular circumstances, even if the calls originate from on-net (as opposed to off-net) locations.

While secure and effective access control mechanisms are critical to the operation of VCN's, numerous instances of entry into a VCN by unauthorized individuals have been reported. This may occur, for example, when a hacker breaks into a PBX via its remote access capability and then dials out to various destinations, or when an unauthorized individual obtains the PIN of an authorized user by trial and error guessing, by obtaining the PIN through unintended disclosure by an authorized user (e.g., by overhearing verbal entry of the PIN into the access control system) or by outright theft of a record (such as a credit card) bearing the PIN. In such events, the compromised HN may be disabled, and the characteristics of the screening filters can be updated to prevent further losses. However, the losses that already occurred cannot usually be remedied. The milk that has been spilled cannot easily be returned to the bottle.

SUMMARY OF THE INVENTION

In accordance with the present invention, a unified and systematic approach is taken both to design of a virtual communications network within a carrier's telecommunications network, and to design the screening filters provided in the VCN data base which control the admission of calls to the network. For this purpose, telecommunications traffic information that is relevant for both the design of the VCN architecture as well as for development of the screening filters is aggregated and applied both to a network design tool that is used to generate the customer's virtual network configuration, as well as to a screening filter generator (SFG). The traffic information may include, for example, traffic data contained in network and customer premises equipment call detail records and billing data.

In preferred embodiments, the SFG also receives output information from the network design tool, indicative of the on-net and off-net locations in the VCN, and information from a carrier data base that provides a weighting factor indicative of the incidence of fraudulent calling to different domestic and international destinations. The SFG is arranged to jointly process the traffic information as well as the fraudulent calling information (together with information relating to VCN design parameters, if desired) in order to generate screening filters that can be installed, and thereafter used, in the VCN to determine, on a call by call basis, whether a call made using the VCN is allowed or denied. Advantageously, the screening filters are designed so that they will minimize or reduce the possibility that the VCN will be used to make fraudulent calls.

BRIEF DESCRIPTION OF THE DRAWING

The present invention will be more fully understood by consideration of the following detailed description, which should be read in light of the accompanying drawing in which:

FIG. 6 is a diagram illustrating the format of records stored in design parameter data base 140 of FIG. 1;

DETAILED DESCRIPTION

Figure 1:
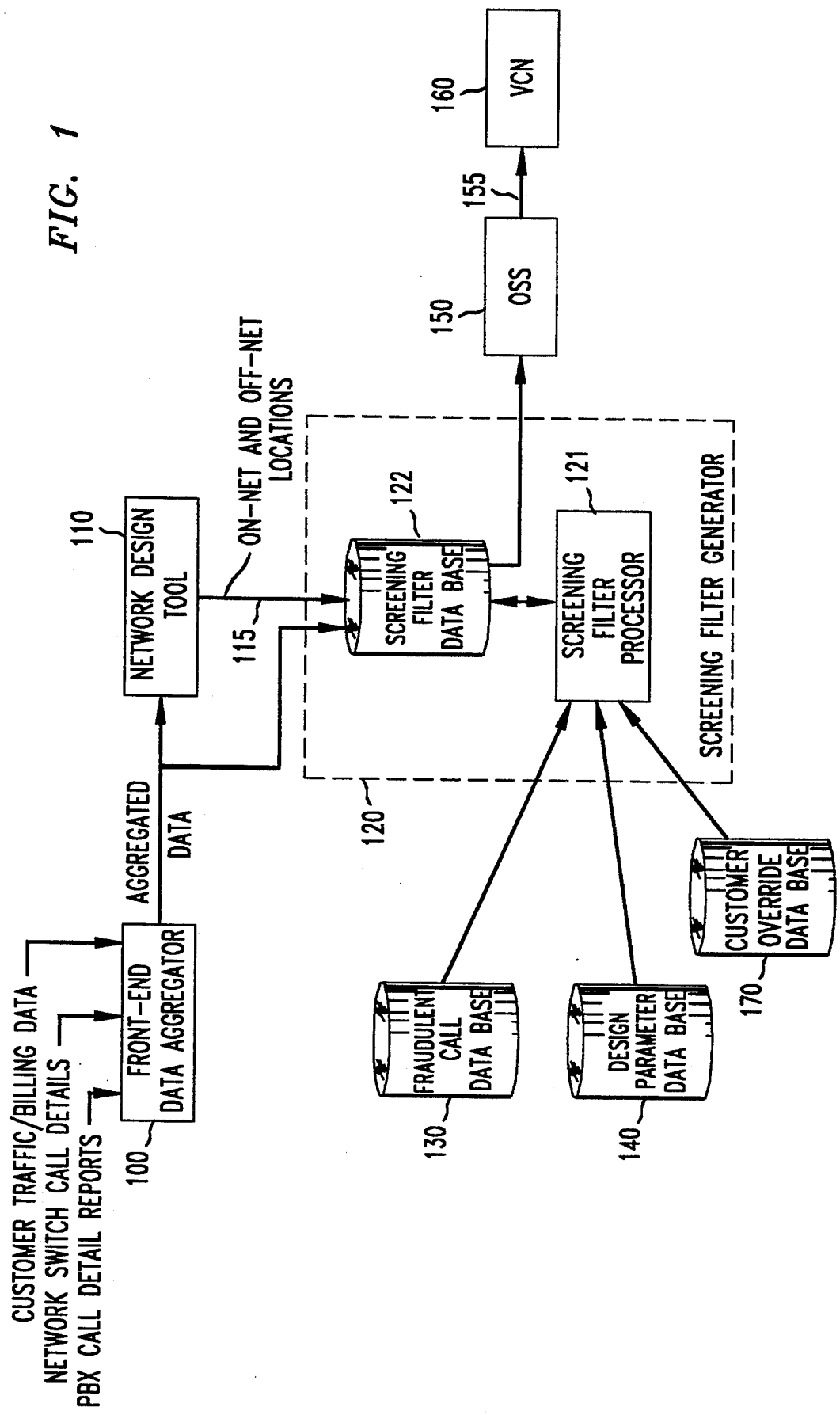
FIG. 1 is an overall block diagram of a system which includes a screening filter generator arranged in accordance with the principles of the present invention.

Referring first to FIG. 1, there is shown an overall block diagram of a system arranged in accordance with the principles of the present invention to design screening filters using customer telecommunications traffic data that is also used to design the customer's virtual communications network. The system includes a front end data aggregator 100, described more fully in connection with FIG. 2, which is of conventional design. Aggregator 100 receives traffic information that is relevant for both the design of the VCN architecture as well as, in accordance with the present invention, for design of screening filters, and processes the information to provide a consistent view thereof that may be easily processed. The traffic information can include any data describing recent use of existing communications networks by the customer in question, such as network switch call detail records, customer premises equipment (e.g., PBX) call detail reports, if the customer is presently using a PBX, and billing records. As will be seen below, data relating to the probable calling patterns that will be observed when the VCN is designed and used as intended may also be supplied to aggregator 100.

The aggregated data compiled in front end data aggregator 100 is applied to a network design tool 110, also of conventional design. Network design tool 110 is arranged to generate an optimized design for the customer's VCN, designated generally as VCN 160 in HG. 1. Generally speaking, optimization of a VCN includes processing of tariff and traffic information as well as other information, in order to select (a) access type, e.g., dedicated or switched; (b) access facilities and size; (c) switches, both network and premises based; (d) on-net locations; and (e) routing logic arrangements. A more complete description of network design tool 110 is provided in connection with FIG. 3.

The optimized network design generated in network design tool 110 includes information which identifies on-net locations and off-net locations. As used here, an on-net location is a customer traffic generating location that is part of the VCN, and that is connected to the VCN by switched or dedicated facilities, while an off-net location is a location outside of the VCN. This information, as well as the aggregated data output from front end data aggregator 100 is applied to screening filter generator (SFG) 120, which includes a screening filter processor 121 and a screening filter data base 122. Generally speaking, the function of screening filter processor 121 is to utilize traffic information describing the customer's calling patterns, as extracted from the aggregated data received from front end data aggregator 100, and information describing the customer's on-net and off-net locations, as extracted from the optimized network design generated in network design tool 110, to generate screening filters that enable the VCN to allow access to the customer's network by persons seeking to make valid calls, but to block calls likely to be invalid, fraudulent or otherwise unauthorized. Screening filter generator 120 is advantageously arranged to also receive inputs from a fraudulent call data base 130, which contains historical information indicative of destinations to which a high proportion of fraudulent calls are made, and an input from a design parameter data base 140, which contains information used in the design of a VCN, such as design parameters, operating characteristics, and performance limitations applicable to the different elements (e.g., switches) in the network. The details of the process performed in screening filter generator 120 are described below in connection with FIG. 7. The format for records stored in fraudulent call data base 130 and design parameter data base 140 are described in FIGS. 5 and 6, respectively.

FIG. 1 also illustrates a customer override data base 170 which is designed to allow updating of the screening films generated in screening filter processor 121 and stored in screening filter data base 122, based upon input information describing the customer's anticipated future telecommunications traffic patterns. For example, while the customer may be making few calls to a certain destination at the present time, the customer may wish to design the screening filters to take account of the customer's plan to establish an office or factory in that location in the near future.

Figure 2:
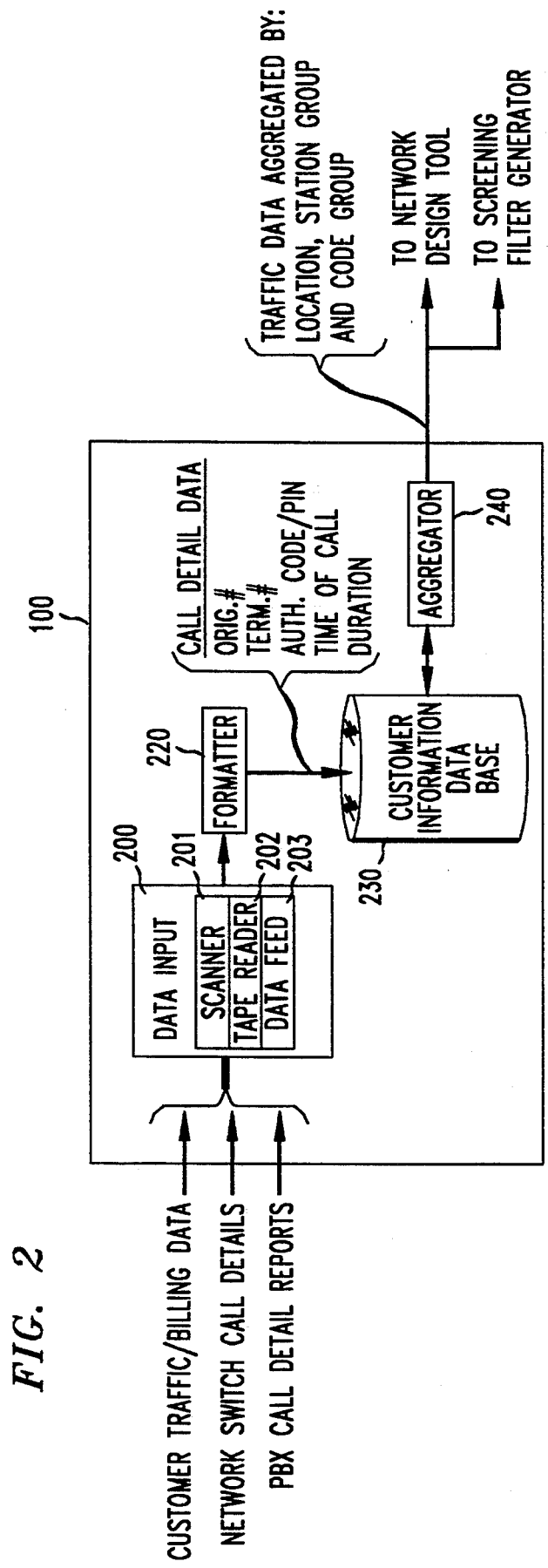
FIG. 2 is a block diagram of front-end data aggregator 100 of FIG. 1.

Referring now to FIG. 2, there is shown a block diagram of conventional front end data aggregator 100 of FIG. 1. A data input module, designated generally as 200, which includes various well known data entry means, including, for example, a scanner 201, a tape reader 202 and a data feed 203, is arranged to receive information describing the customer's historical calling patterns. Such information may be obtained from customer billing records, as well as from call detail information from customer switches (PBX's) and telecommunications network switches that serve the customer. This information can be supplied in the form of magnetic or paper tape, electronic data files, or other media.

Information applied to front end data aggregator 100 via data input module 200 is applied to a formatter 220, which is arranged to reformat individual data elements to provide a consistent view thereof. Reformatting, which can be performed using any of several presently available data processing software applications such as the Informix database system, may include, for example, processing to insure consistency of the representation (i.e., format) of dams (e.g., "month-day-year", rather than "day-month-year") that are obtained from several sources. The data output from formatter 220 comprises a series of call detail records that are stored in a customer information data base 230 before being applied, one at a time, to aggregator 240. The information in each call detail record may include data describing a single call, including, for example, the originating station number, destination station number, authorization code or personal identification number (PIN) used to make the call, the time at which the call was made, and the call duration. This information may also include connect dam, toll switch ID numbers, etc. Database 230 may also be arranged, if desired, to store sample formats and processing instructions used by formatter 220 during its processing.

Call detail records in data base 230 are applied to aggregator 240 for the purpose of combining various elements of customer traffic information in each call detail record into a form useful in designing a communication network for that customer. Generally speaking, aggregated data output from aggregator 240 is in summary form, grouped in accordance with origination elements (defined below), and sorted, within each group, by origination element and then destination. For the purposes of explanation, an "origination element" is a classification useful to the customer, such as (a) a location, (b) a station group, or (c) an authorization code/PIN group. The output from aggregator 240 is applied to network design tool 110 and to SFG 120.

As used herein, a "location" can refer to a geographical or organizational location having one or more originating telephone stations. For example, a location can be a particular group of offices, all offices in a particular building or on a campus, or groups of several offices in a city that have an affinity with each other that is meaningful to the customer for whom the VCN is being designed. Each of the origination station numbers contained in each call detail can be mapped to one location. A "station group" refers a predetermined group of originating station numbers that have an affinity with each other that is meaningful to the customer for whom the VCN is being designed. For example, one station group may serve the personnel department of a company, one may serve the accounting department, and another may serve the parts department. Each of the origination station numbers contained in each call detail record can be mapped to one station group. A "code group" refers a predetermined group of callers that originate calls using an authorization code or PIN. Members of the caller group have an affinity with each other that is meaningful to the customer for whom the VCN is being designed. For example, one group may be key corporate executives, another may be sales people with international territories, and another may be lower level clerical personnel. As with locations and station groups, each authorization code or PIN used to make a call can be mapped to one code group. Information defining the relationship between origination station numbers, on the one hand, and locations and station groups, on the other hand, and between authorization codes/PINs on the one hand, and code groups, on the other hand, is stored in data base 230.

Figure 3:
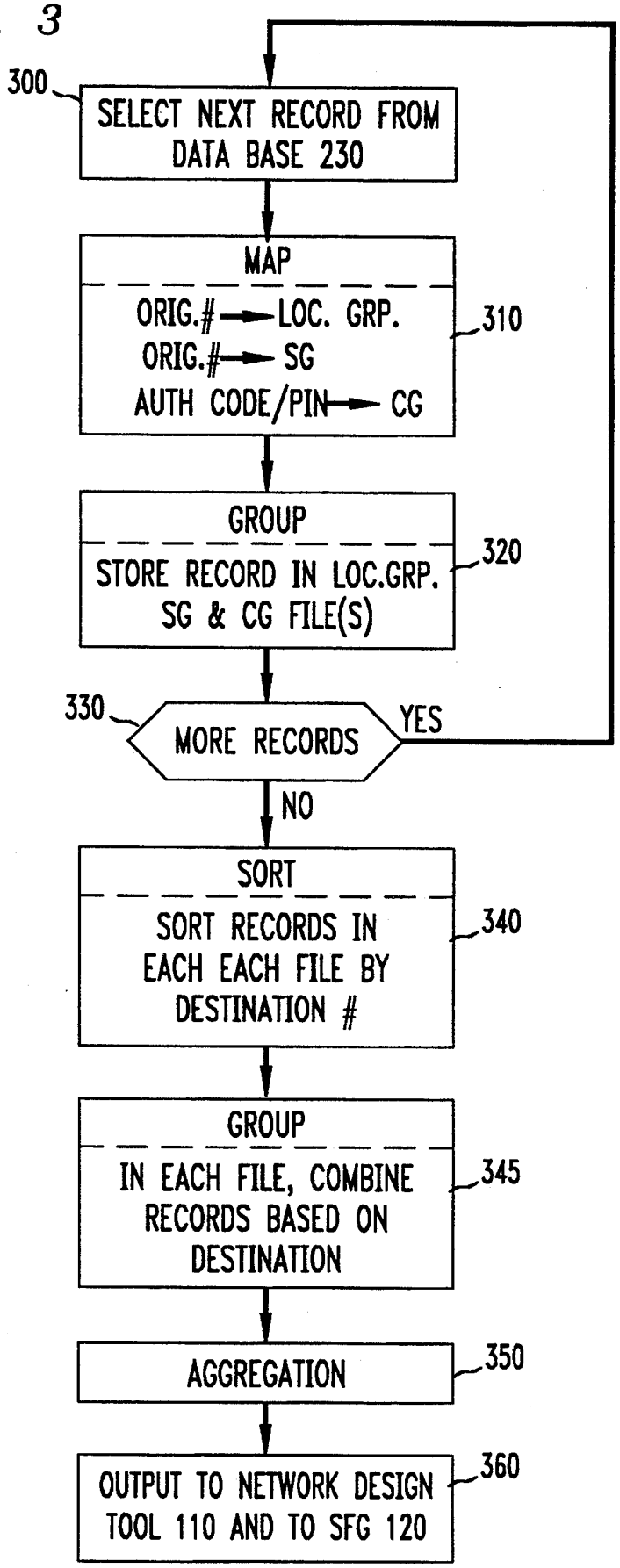
FIG. 3 is a flow diagram illustrating the aggregation process performed in aggregator 100.

The operation of aggregator 240 of FIG. 2 will be better understood by reference to FIG. 3, which illustrates the steps followed in carrying out the aggregation process. The process begins in step 300, wherein a call detail record stored in data base 230 is retrieved. In step 310, information in the call detail record is mapped, so that (1) the location(s) and station group(s) corresponding to the origination station number and (2) the code group corresponding to the authorization code/PIN are ascertained and available. In step 320, traffic information from the call detail record is then grouped with information from other "like" call detail records, by storing the information in (1) a location file, (2) a station group file, and/or (3) a code group file, all within data base 230, appropriately indexed so that sorting may thereafter occur. In the location file, records are stored using location as a key. In the station group file, records are stored using station group as a key. Similarly, in the code group file, individual records are stored using the code group as a key. If it is determined in step 330 that more call detail records exist that require processing, steps 300-320 are repeated.

When all call detail records in data base 230 have been processed, all of the records in each of the three files (location file, station group file, and code group file) within data base 230 are sorted in step 340. Specifically, the records in the location file are sorted, first by location and then by destination; the records in the station group file are sorted, first by station group and then by destination station number; and the records in the code group file are sorted, first by code group and then by destination station number. (As used herein, "destination" can refer to a destination country, a destination area code, a destination telephone exchange, a destination telephone number, or some other indicia of where the call is to be routed.) When the sorting performed by step 340 is completed, data in each of the three files is again grouped in step 345, this time by combining records based on the destination. Grouping is separately performed for each of the three files. For example, in the location files, records for each originating location are examined to select all calls going to individual foreign countries (as determined by the country code portion of the destination telephone number) or going to individual geographic regions in this country, based upon the area code portion of the destination telephone number. The same can be done, separately, for records in the station group file. For the records thus selected, other traffic data contained in the records is aggregated or combined in step 350. Thus, for example, the number of calls from an originating location (e.g., a particular building) to each foreign country, as a function of time of day when the call was originated, can be determined. In the code group files, similar information is grouped in step 345, so that, for example, the number of calls from each code group to each destination (e.g., a country), as a function of day of the week, can be determined. Thus, during aggregation of records in step 350, meaningful information is assembled describing the communications traffic patterns between each originating location, station group and code group, and each group of destinations.

Following aggregation in step 350, the aggregated information is output to network design tool 110 and to SFG 120 in step 360.

Figures 4, 5:
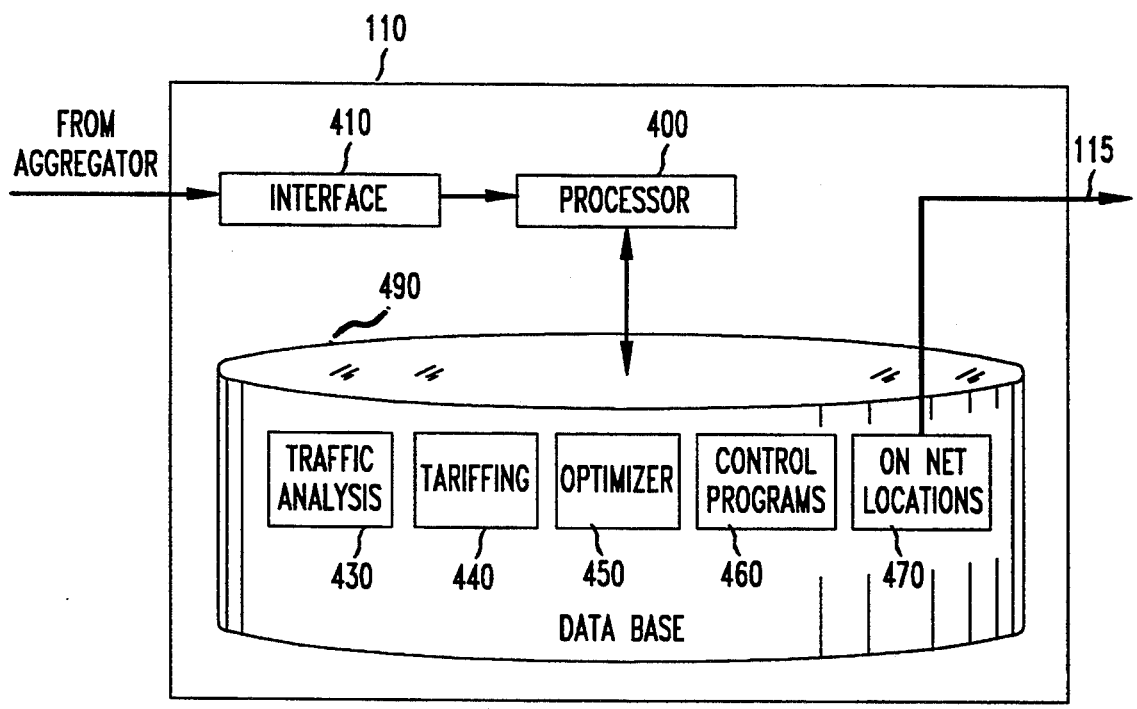
FIG. 4 is a block diagram of network design tool 110 of FIG. 1.
FIG. 5 is a diagram illustrating the format of records stored in fraudulent call data base 130 of FIG. 1.

Referring now to FIG. 4, there is shown a block diagram of one implementation of a network design tool 110 of FIG. 1. Aggregated communications traffic information is received from front end data aggregator 100 in an interface circuit 410 and applied to a processor 400, which operates in accordance with control program 460 stored in a data base indicated generally as 490. Database 490 has four other data storage elements: traffic analysis information, stored in data base element 430; tariffing information, stored in data base element 440; optimizer information, stored in data base element 450; and on-net location information, stored in data base element 470. The latter information is one output, or result, of the design process. Network design tool 110 takes aggregated data as input and designs an optimized VCN, i.e., it produces a network design that is most efficient for the customer in terms of various generally accepted telecommunications network performance parameters, such as queuing time for inbound and outbound calls, call set up time, blocked calls, transmission quality, and, of course, cost. As stated previously, stations that are part of the VCN designed using the optimized network design are called "on-net" locations. Information identifying these stations, which is stored in on-net location data element 470, is output from network design tool 110 and applied to screening filter generator 120 via line 115. Examples of currently available network design tools that perform this function are the Hybrid Network Design System available from J.B.A. Inc. and the Quintessential system available from Quintessential Inc.

In addition to receiving information defining "on-net" locations from network design tool 110, screening filter generator (SFG) 120, as previously noted, also receives information from fraudulent call data base 130. This information includes a weighting factor "F" indicative of the incidence of fraudulent calling with respect to calls placed to different domestic and international destinations. FIG. 5 illustrates the typical format of records stored in fraudulent call data base 130 of FIG. 1. As shown, a series of entries in column 500 represent call destinations, either in terms of geographic location, area code, country code, or other similar indicia recognizable by screening filter generator 120. A corresponding series of entries in column 510 represent the value of the weighting factor "F" indicative of the probability (1 is greatest, 0 is least) that a call to a particular destination is fraudulent. The information represented by the records of FIG. 5 is not customer specific, but rather is generalized information obtained from the carrier's experience with fraudulent calls. For example, it is known that the incidence of fraudulent calling to certain "third world" or under-developed countries is generally higher than calls to industrialized countries in western Europe.

FIG. 6 is a diagram illustrating the typical format of records stored in design parameter data base 140 of FIG. 1. Generally speaking, the stored information in data base 140 contains, for different network elements (such as switches and data bases), applicable design parameters, operating characteristics and performance limitations. Thus, information which may be included in data base 140 can describe, for example, capabilities of customer premises switches (PBX's), specific trunk arrangements for network switches, and interconnection arrangements between switches and data bases. Column 610 in each record indicates, for a given network element, individual characteristics applicable to that element. For example, characteristics for a switch may include maximum number of destination locations that can be stored in each screening filter; maximum number of station groups that can be configured; maximum number of code groups that can be configured; and time of day (TOD) and day of week (DOW) screening limitations for the network element. Column 620 indicates the value of the particular characteristics in column 610, e.g., no more than 250 locations may be stored in a screening filter; no more than 200 station groups can be configured; and no more than 200 code groups can be configured.

Figure 7:
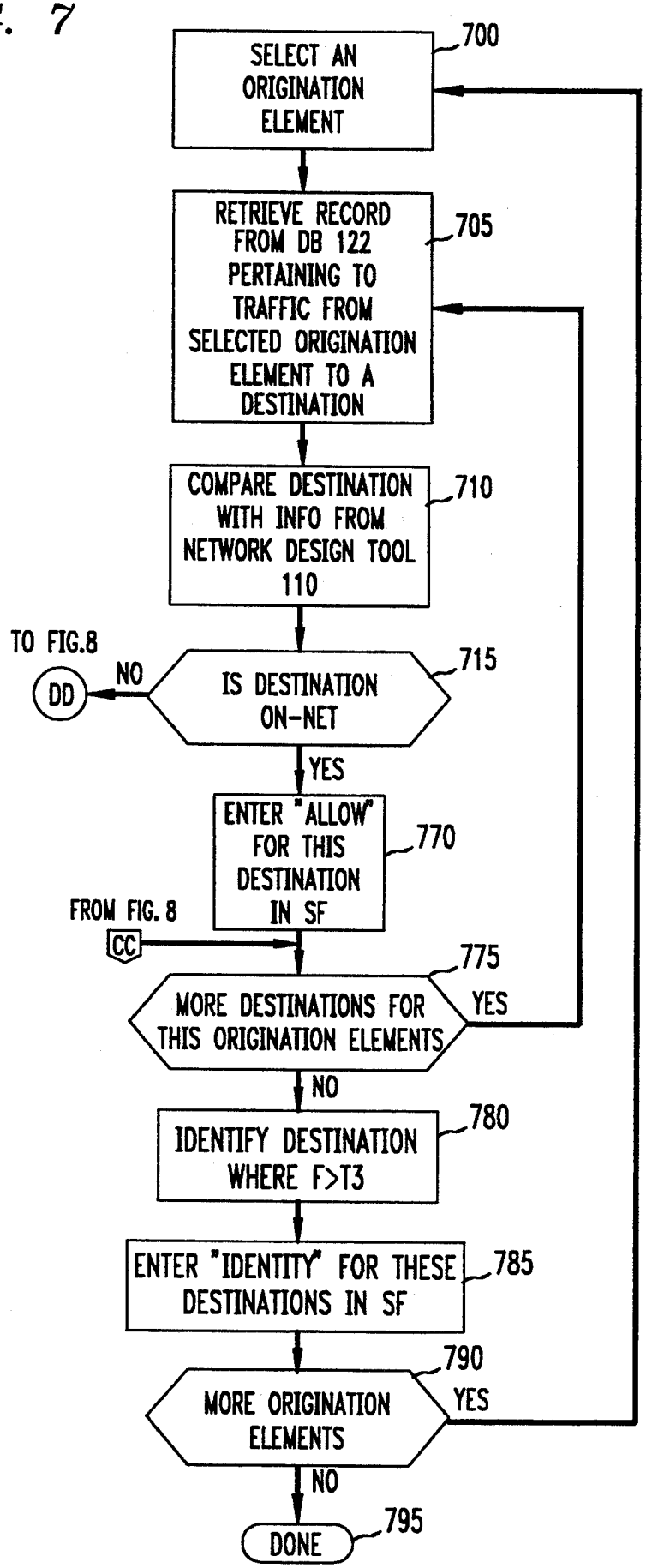
FIGS. 7 and 8 are flow diagrams that describe the process performed in screening filter processor 121 for generating the screening filters stored in screening filter data base 122 of FIG. 1.

Referring now to FIG. 7, there is shown a flow diagram that describes the process performed in screening filter processor 121 for generating screening filters that are stored in screening filter data base 122 of FIG. 1. As stated previously, the overall function of screening filter generator 120 is to process historic customer specific traffic information together with generic information relating to fraudulent call locations and VCN design parameters in order to generate screening filters that are stored in screening filter data base 122.

The process of FIG. 7 begins in step 700, wherein a first origination element is selected for which a screening filter is to be constructed. As stated previously, an origination element can be a particular location, a station group or a code group. Next, in step 705, a record is retrieved from data base 122 indicating the traffic characteristics for calls originating from the selected location, station group or code group, to a first particular destination. In step 710, the destination is compared with information retrieved from network design tool 110 via line 115, so that a determination can be made in step 715 as to whether or not the destination is "on-net" or "off-net". This determination is advantageous because different treatment can be provided for calls directed to different destinations, thereby taking account of the fact that fraudulent or unauthorized calls are more likely to be made to off-net locations.

Figure 8:
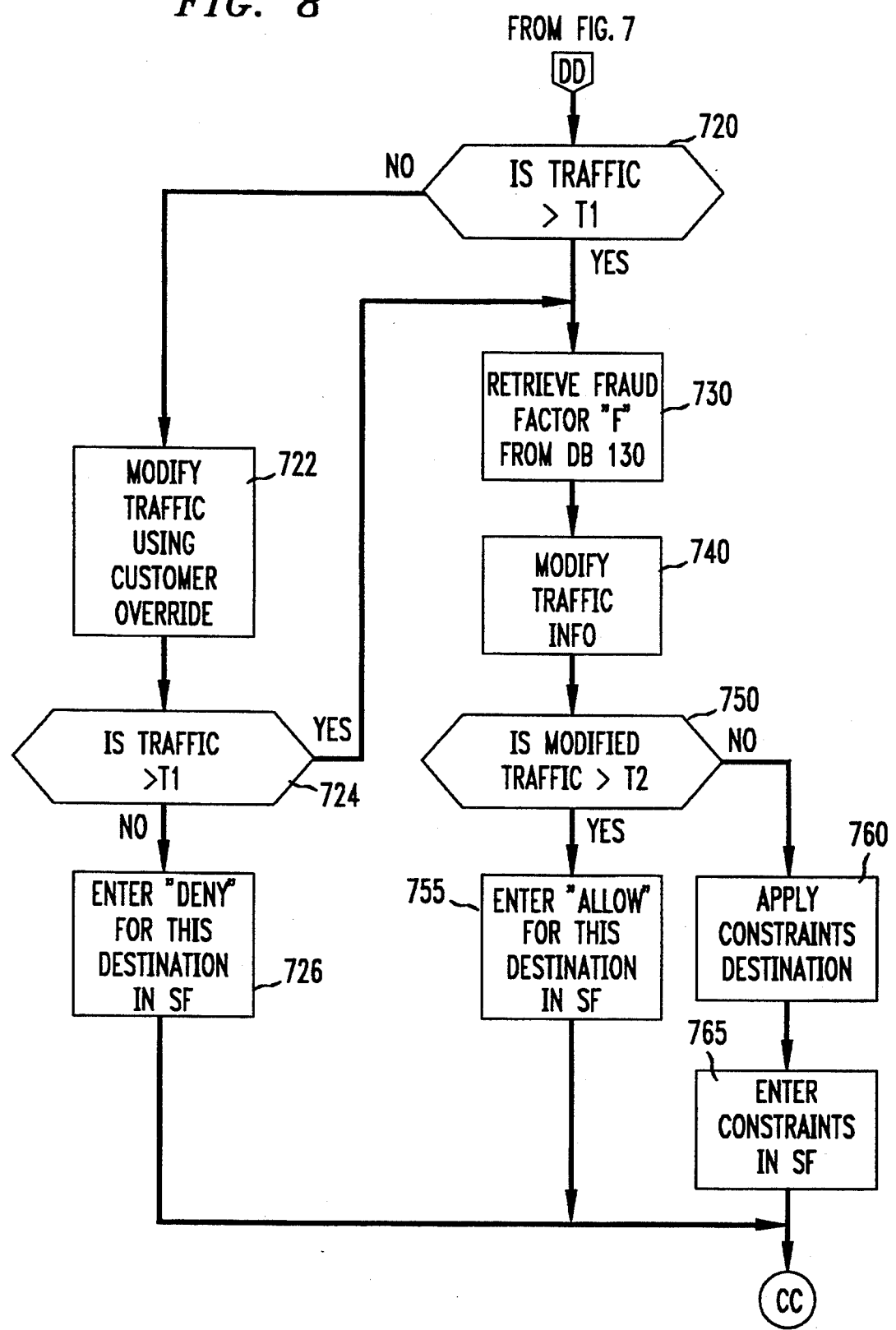

For records pertaining to off-net destinations, a determination is next made in step 720 (FIG. 8) as to whether the traffic volume per unit time to that destination exceeds a first threshold value T1, which value is chosen so as to differentiate between likely destinations, on the one hand, and unlikely destinations on the other hand. If the result of the test in step 720 is negative, the traffic characteristics for calls to this destination are next modified in step 722 in accordance with customer override information contained in data base 170. This is done so that anticipated traffic to a particular destination can be accounted for in the screening filter being prepared. For example, if the customer plans to do business in a new tendtory, calls to that destination would be expected, even though historical data would include little or no traffic to that destination. Following modification in step 722, a test is again made in step 724 to determine if the traffic volume is greater than the threshold value T1. If a negative result is obtained, it can be fairly concluded that little traffic has been carded to the destination in question, and little traffic to that destination is anticipated. Accordingly, a denial indication (a "DENY") for that destination may be entered in step 726 in the screening filter contained in screening filter data base 122. On the other hand, if the traffic level in steps 720 or 724 exceeds the threshold value T1, a different procedure is followed.

In the events mentioned above, the "fraudulent location weight" applicable to the destination currently being processed is next retrieved from data base 130 in step 730. This weight is used to modify the traffic information for the destination in step 740. The purpose of this modification is to adjust the traffic value downward, eliminating traffic to the particular destination that is likely to be unauthorized. For example, if the traffic to a first destination is generally valid, the weight associated with fraudulent traffic to that destination is generally low, say 0.1. The remaining traffic, given by the value (1−weight), is therefore generally high, in this example 0.9. This factor is applied to the traffic value contained in the record being processed by simple multiplication, thereby yielding a modified traffic value which is reduced from the previous value by 10%. This modified value is, in rum, compared with a second threshold value T2, in step 750. Note here that the second threshold value may, but need not, be the same as the first threshold value T1. If the result of the comparison in step 750 indicates a modified traffic value in excess of T2, it can again be assumed that a large amount of authorized traffic can be expected to the destination in question. Accordingly, for that destination, an "ALLOW" entry is placed in the screening filter stored in data base 122 in step 755. If the result of the comparison in step 750 indicates a modified traffic value less than T2, it can be concluded that the amount of authorized traffic to the destination in question is likely to be low. However, it is generally desirable not to block all traffic in this instance, since some amount of traffic is to be expected. Under these circumstances, various "constraints" can be applied to the entry in the screening filter. These constraints can determine if certain conditions have been satisfied and allow or deny a particular call as a function of the results of such determination. The conditions can relate to the number of calls made per unit of time, the time of day or day of week at which the calls are originated, or other similar factors chosen during the screening filter design process. The constraints applied in step 760 must be consistent with the capabilities of the network element containing the screening filter, as determined by the information stored in design parameter data base 140. After the appropriate constraints have been determined, the entry for the presently processed destination is stored in screening filter data base 122 in step 765.

If it is determined in step 715 that the destination contained in the retrieved record is for an on-net location, it may generally be assumed that the call is authorized, since there is a community of interest between persons originating and receiving calls on the same VCN. Accordingly, an "ALLOW" entry is made in the screening filter in step 770. It is to be noted, however, that in some circumstances it may be desirable to apply constraints to, or totally block, calls to certain destinations even though the destinations are "on-net". In such event, the process beginning in step 720 may be applied to records pertaining to calls made to those destinations.

After processing of a record is completed either in step 726, 755, 765 or 770, a determination is made in step 775 as to whether there are additional destinations to be processed for the selected origination element. If so, the process of FIG. 7 is repeated, beginning with step 705.

When all destinations have been processed, steps 780 and 785 are performed, in order to account for the possibility that, for the selected origination element, no traffic information will be available for certain destinations, indicating that calls to these locations should be blocked. In step 780, all destinations with weighting factor "F" greater than a threshold value T3 are identified. A "DENY" entry for these destinations is then added to the screening filter for the selected origination element in step 785, thereby supplementing information entered in step 726.

The process of FIG. 7 then continues with step 790, in which a determination is made as to whether additional records remain to be processed in data base 122. If so, the process of FIG. 7 beginning in step 700 is repeated. When all records have been processed, the process of FIG. 7 is completed in step 795.

Figures 9, 10:
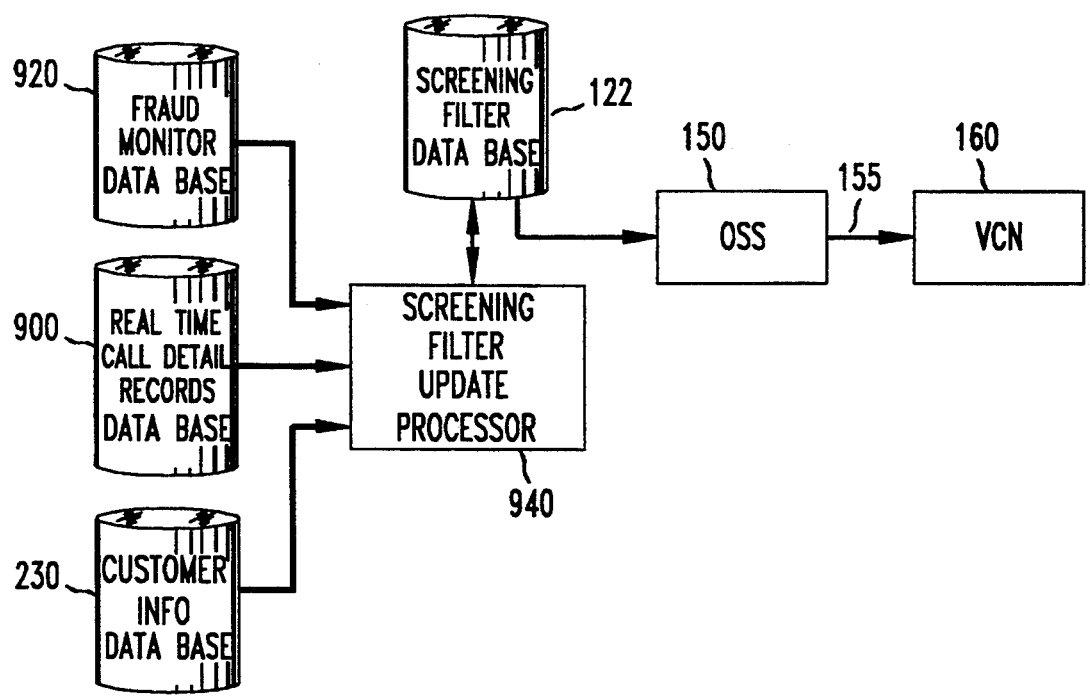
FIG. 9 is a diagram illustrating the format of a typical screening filter stored in screening filter data base 122.
FIG. 10 is a block diagram illustrating the interrelationship between a screening filter update processor 940 arranged in accordance with the principles of the present invention and various data bases that provide information needed to update the screening filters stored in screening filter data base 122 which are then provided to VCN 160 via OSS 150.

Referring now to FIG. 9, there is shown a typical format for a screening filter stored in screening filter data base 122. A screening filter can be thought of as a logical table pertaining to one origination element, such as a particular location, station group or code group. For that origination element, the screening filter contains either allow (denoted by entry "ALLOW"), deny (denoted by entry "DENY") or constrained status (denoted by entry "CONSTRAINED") for calls going from that originating element to various destinations. Constrained status can indicate that calls are allowed based upon factors such as number of calls made per unit time, or time of day and day of week when call origination occurs. Thus, in FIG. 9, for an originating location X, column 901 represents destination information, which, as explained previously, may be arranged by geographic location (e.g., country code); code group (e.g., area code); or station group (e.g., telephone exchange). Column 902 represents the status of calls to that destination, either ALLOW, DENY or CONSTRAINED. If an entry "CONSTRAINED" is contained in column 902, then various logical conditions that may be associated with an access decision are set forth in column 903. The following example will illustrate. If the information processed in data aggregator 100 shows that the customer makes only two calls to England during a typical business day from a location in New Jersey, the entry in column 903 may be denoted "ALLOW(N)", indicating allowance for up to N calls, and disallowance for subsequent calls during a business day.

Screening filters generated in screening filter processor 121 are stored in screening filter data base 122 prior to being applied to the switching elements in VCN 160. Transfer of the information in the screening filters is made via operations support system (OSS) 150, which is a front end to the network elements in VCN 160 in which the screening filter is stored and processed. OSS 150 is arranged to verify the information in the screening filters and then to download the screening filters into the network elements that control admission and denial of calls in VCN 160, e.g., switches and data bases.

The process contemplated by the present invention is not static, in that calling patterns are apt to change even after initial configuration of the VCN and subsequent to initial loading of screening filters in the network elements within the VCN. For this reason, after the screening filters have been activated, there should be ongoing monitoring of calls made by the customer using the VCN to identify any fraudulent attempts and a feedback mechanism to make incremental changes to the screening filters based on that information. This updating amounts to a self-learning process that updates the screening filters based on data collected in the virtual communications network. To understand the updating process, reference to FIG. 10 will be instructive. This figure is a block diagram illustrating the interrelationship between a screening filter update processor 940 arranged in accordance with the principles of the present invention and various data bases that provide information thereto:

As shown in FIG. 10, screening filter update processor 940 receives inputs from two data bases not previously described, namely, real time call detail records data base 900 and fraud monitor data base 920. Data base 900 contains records of calls that are made by users of VCN 160, and typically includes information describing, for each call, its point of origin and destination, as well as the call result, i.e., completed or blocked. If a call is blocked, records in data base 900 also include information indicative of the reason for the non-completion, such as that the call was blocked in the screening process using the screening filters just described, or for other reasons. Data base 920 includes records for blocked calls, which are formulated using information obtained from the VCN customer. The information in these records includes information indicating if a given call was indeed found to be, or thought to be, fraudulent. This information may be compiled by analyzing customer payment records to indicate which calls were disputed, which calls were paid without protest, and which calls were segregated for further analysis.

Screening filter update processor 940 also receives definitional inputs stored in customer information data base 230, so that call detail records from data base 900 can be analyzed and segregated in terms of code groups and station groups, if necessary. Screening filters are presented to processor 940 from screening filter data base 122, and returned to that data base after the updating process is completed.

Figure 11:
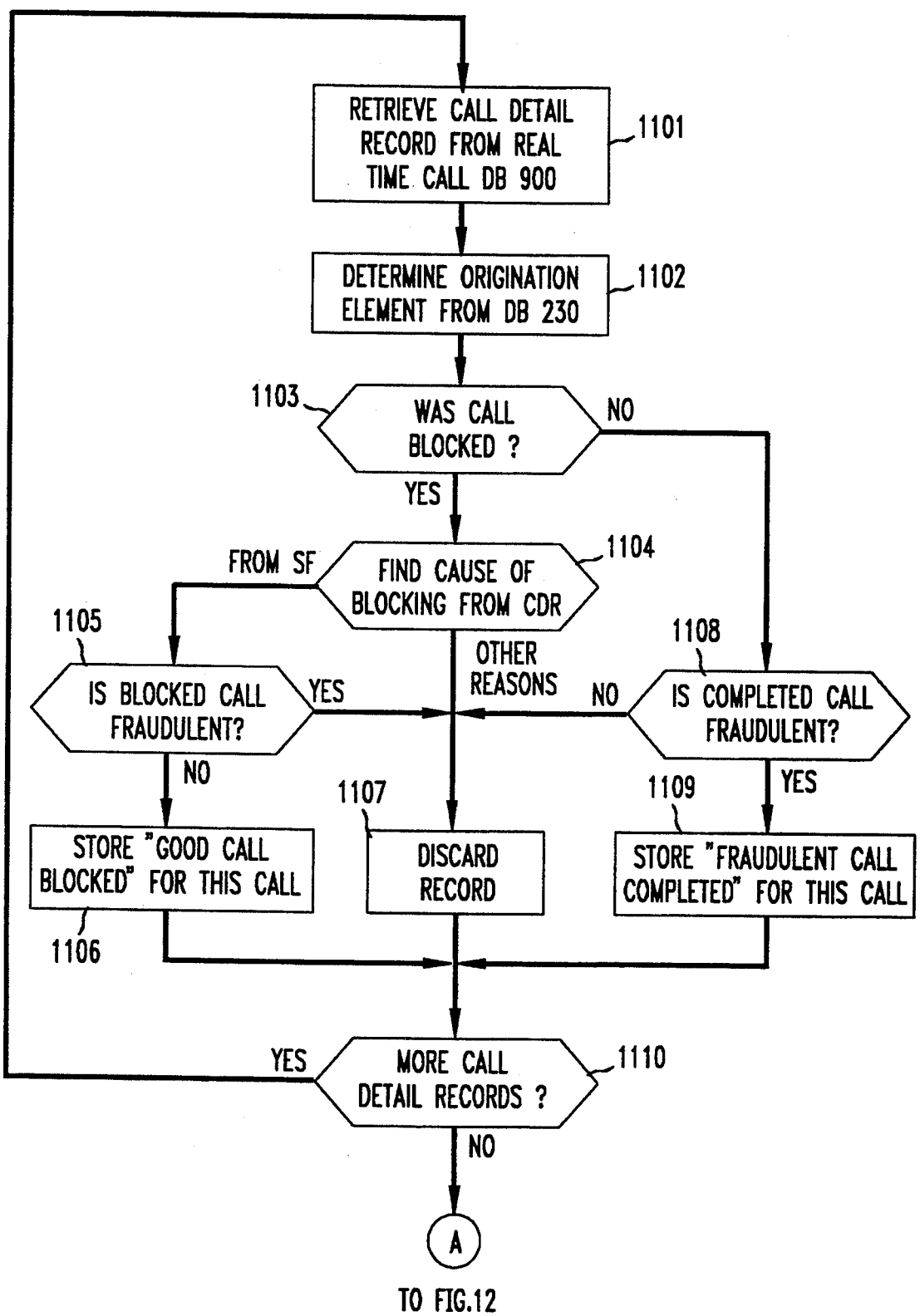
FIGS. 11 and 12 are flow diagrams that describe the process performed in screening filter update processor 940 for updating screening filters that have previously been stored in screening filter data base 122.
Figure 12:
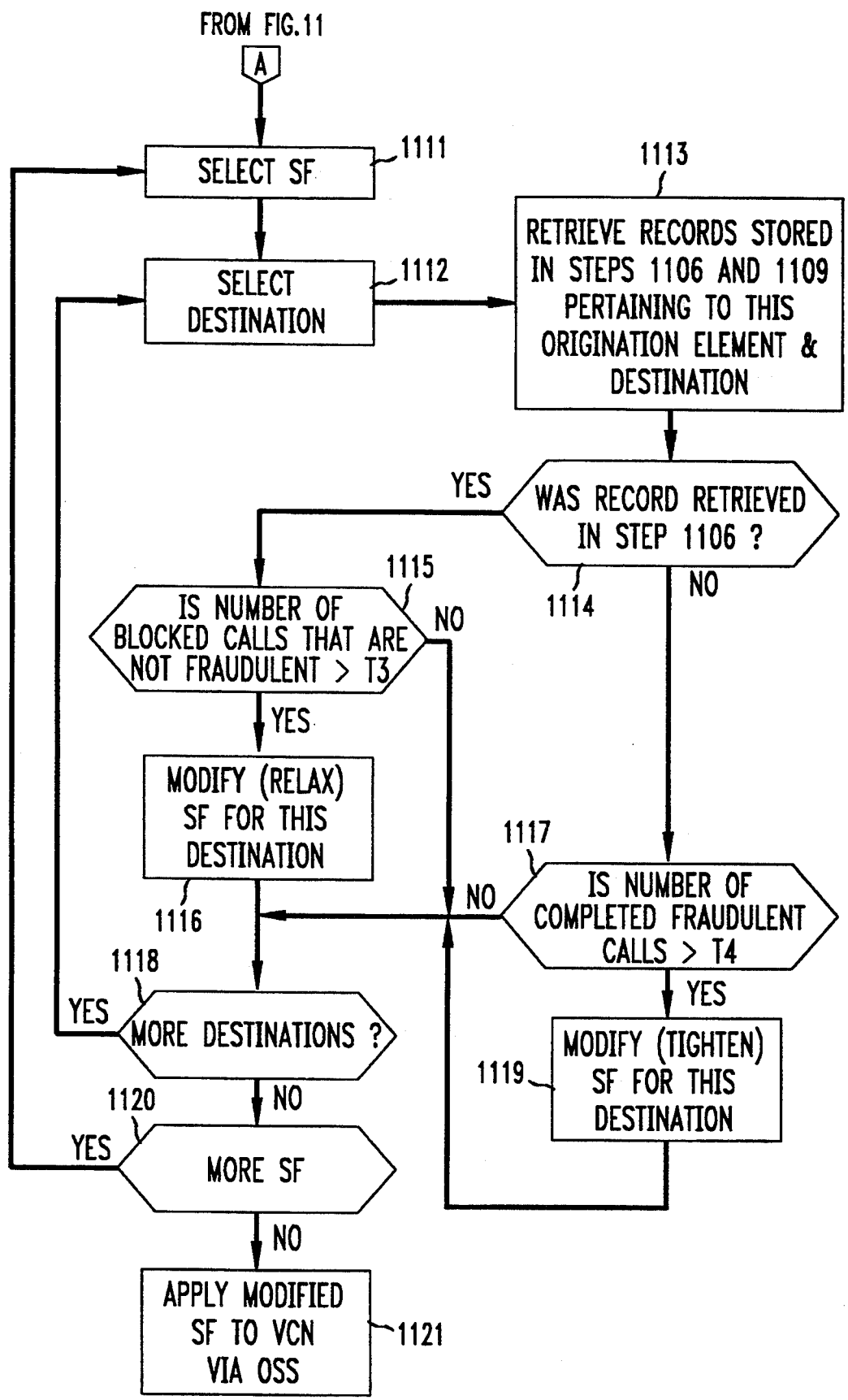

Referring now to FIGS. 11 and 12, the process for updating screening filters stored in screening filter data base 122 is illustrated. Basically, the process has two pans: (a) examining call detail records to determine if the screening filters are operating properly or, if not, to determine if the screening filters should be relaxed or tightened, and (b) actually updating the screening filters appropriately. During the first part of the process, blocked calls are examined to isolate calls blocked due to the screening process (as opposed to being blocked for other reasons, such as network congestion, called party unavailability, etc). If calls were blocked due to screening, a determination is made as to whether the screening filter operated properly. If so, no change is necessary; if not, an adjustment is made. Conversely, calls that are not blocked are also examined to determine if they should have been blocked during the screening process, so that the screening filter can be appropriately updated. The update process can be 5performed on a periodic basis, or at any time when a significant change in calling patterns has been detected.

The screening filter update process described above begins in step 1101, in which a call detail record is retrieved from real time call records data base 900. The record is examined in step 1102, to extract information defining the call origination point, and this information is compared with stored information in customer information data base 230 to determine the origination element (station group, code group, etc.) associated with the call. In step 1103, a determination is made, again by examining information in the call detail record, as to whether the call was blocked. If a positive result is obtained in this step, information defining the cause of the blocking is extracted from the call detail record in step 1104. As stated previously, the cause can be from use of the screening filter, or from other reasons associated with the network, the calling party, or other factors not pertinent to this invention.

If it is determined that the call was blocked (step 1103), and the cause of the blocking was due to the action of the screening filter (step 1104), a determination is made in step 1105 as to whether the blocked call was in fact (or is likely to be) fraudulent. If a call was blocked due to screening, and was in fact fraudulent, the system is operating properly. In that event, the record is discarded in step 1107. On the other hand, if a call was blocked due to screening, and was not in fact fraudulent, the system is not operating properly. In that event, the record is stored for further processing in step 1106. Storage may be in data base 122, or a separate data base, not shown.

If it is determined that the call was not blocked (step 1103), a determination is made in step 1108 as to whether the completed call was in fact fraudulent. If so, the system is not operating properly, and the record is stored for further processing in step 1109. On the other hand, if a negative result is obtained in step 1108, the record may also be discarded in step 1107. Note that calls that were blocked for reasons not related to screening are also discarded in step 1107.

When a particular call detail record retrieved in step 1101 has been processed, a determination is made in step 1110 as to whether there are more records for processing. If so, the process beginning in step 1101 is repeated. If not, the first part of the process is complete, and the second part, beginning with step 1111 of FIG. 12, is performed. As stated previously, screening filters that contain restrictions which need to be relaxed or tightened are identified and appropriately modified.

In step 1111, a screening filter stored in data base 122 is selected. For this screening filter, a particular destination location is selected in step 1112. Next, the records stored in steps 1106 and 1109 are examined in step 1113, to retrieve all of those records that pertain to the origination element of the selected screening filter and to the destination selected in step 1112. These records are categorized in step 1114, such that retrieved records pertaining to "good calls blocked" that were stored in step 1106 are treated differently from "fraudulent calls completed" that were stored in step 1109. With respect to the former calls, a determination is made in step 1115 as to whether or not the number of such calls exceeds a predetermined threshold T3. If so, the restriction placed on these calls by the screening filter are too stringent, and must be relaxed in step 1116. This is done, for example, by changing the constraints shown in column 903 of FIG. 9. On the other hand, if a negative result is obtained in step 1114, indicating that "fraudulent calls completed" that were stored in step 1109 are being processed, a determination is made in step 1117 as to whether or not the number of completed fraudulent calls exceeds another predetermined threshold T4. If so, the restriction placed on these calls by the screening filter is too lenient, and must be tightened in step 1119. After information in the screening filter pertaining to the current destination is updated in either step 1116 or 1119, a determination is made in step 1118 as to whether there are more destinations in the selected screening filter that must be processed. If so, the process is repeated, beginning with step 1112. When there are no more destinations for the selected screening filter, a determination is made in step 1120 as to whether there are more screening filters in data base 122 that require updating. If so, the process beginning with step 1111 is repeated. When all processing has been completed, the modified screening filters are updated in data base 122 and may be applied to VCN 160 via OSS 150, in step 1121.

Figure 13:
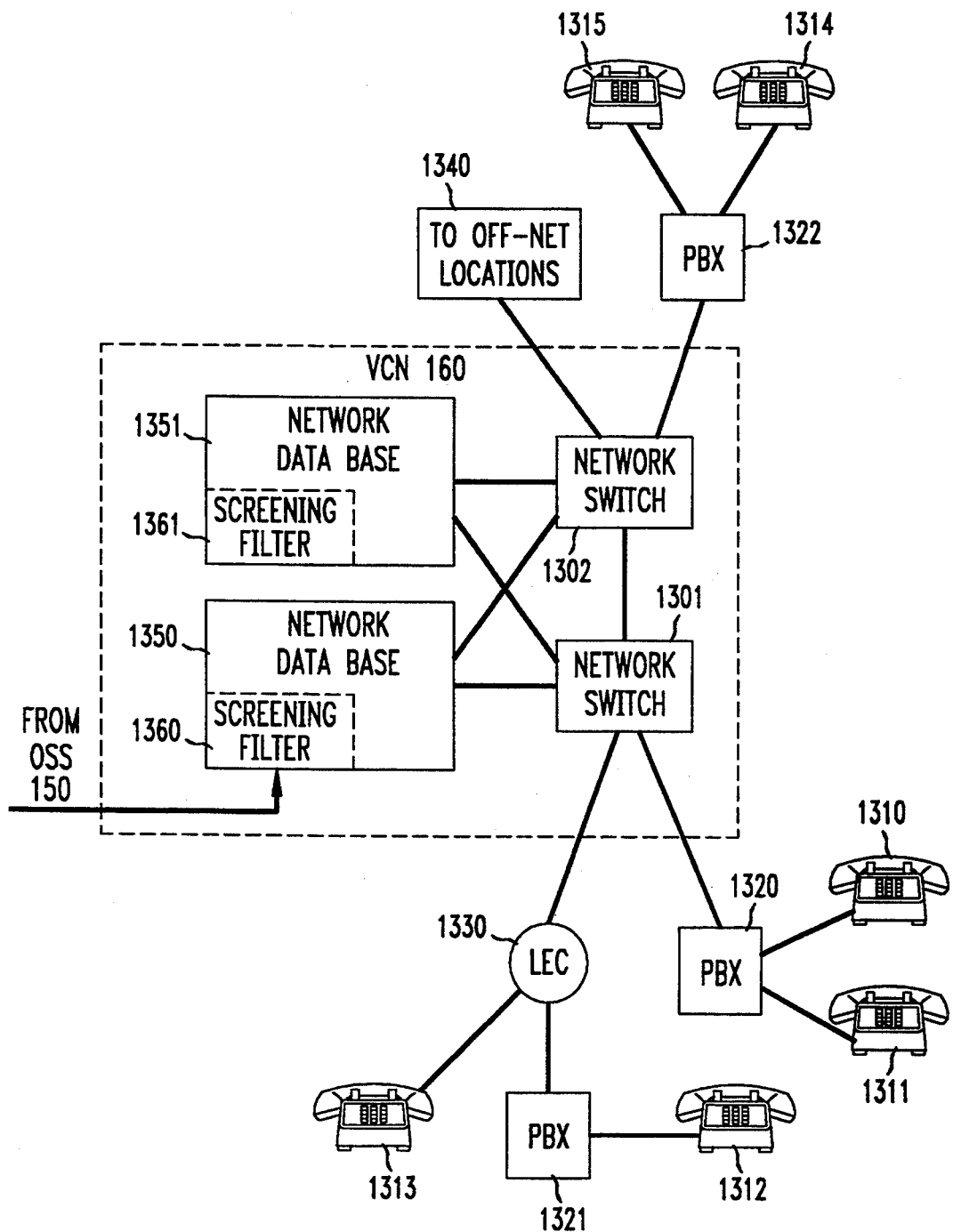
FIG. 13 is a block diagram illustrating some of the network elements in a typical virtual communication network such as VCN 160, and the interconnection between the VCN and on-net and off-net call destination and origination locations.

FIG. 13 is a block diagram illustrating some of the network elements in a typical virtual communication network such as VCN 160, and the interconnection between the VCN and on-net and off-net call destination and origination locations. At the heart of the network are several interconnected network switches, which may be software controlled electronic switching systems such as the 4ESS ™ electronic switch available from AT&T. Two such switches 1301 and 1302 are shown in FIG. 13 and are used to carry both ordinary long distance telecommunications traffic as well as traffic originated by VCN customers who have arranged with the network provider to have calls completed via VCN 160 in a convenient, economical and otherwise advantageous manner. The switches in the VCN are supported by one or more data bases, such as 1350 and 1351.

A call initiated by a VCN customer may originate from an "on-net" location, such as telephone stations 1310 or 1311, which are connected to network switch 1301 via a first customer owned PBX 1320, which is linked to switch 1301 via dedicated access facilities. Other "on-net" dedicated locations are telephone stations 1314 and 1315 connected to a different network switch 1302 via a second customer owned PBX 1322. The call may also originate from an "on-net" switched location, which could be another station 1312 connected to switch 1301 via switched local access provided by a local exchange carder (LEC) network designated generally as 1330. Station 1312 is served by another PBX 1321.

Stations 1310 and 1311 are "on-net" dedicated locations because they are connected to the VCN via dedicated access, and information regarding these stations is known, in advance, by the elements in VCN 160. On the other hand, station 1312 is an "on-net" switched location, because it is connected to the VCN via switched access, and information regarding this station is also known in advance by the elements in VCN 160.

Additionally, VCN 160 is typically arranged to allow calls originated from off-net locations at least some access to the services provided by switch 1301. These calls are generally referred to as VCN Remote Access Calls. Station 1313 is connected to the switch 1301 via switched local access provided via a local exchange carder (LEC) network 1330. Information about this station is not known in advance by the elements in VCN 160. Access to the VCN service is gained when the user dials a predetermined number recognized by switch 1301 as a request for access. At that point, the user typically also provides other identification information (such as a password) needed to determine if access should be allowed or denied. In addition, as provided in the present invention, access for both on-net and off-net originated calls must be permitted by the screening filter which contains an ALLOW, DENY or CONSTRAINED indication for each VCN call. For the purposes of completeness, FIG. 13 also shows off-net locations 1340 connected to switch 1302.

When a call is received in network switch 1301 or 1302 and identified as a VCN call, i.e., originating either (a) in an on-net location or (b) by a VCN customer in an off-net location, a query is routed to an associated data base (data base 1350 or 1351, depending on the customer) so that stored information relating to the call can be retrieved. This information enables appropriate call treatment, such as abbreviated dialing, special billing, and predefined routing, to be provided. However, before the call is allowed access to routing via switch 1301 or 1302, the appropriate screening filter 1360 or 1361 stored in the network data base 1350 or 1351, respectively, is also retrieved. Within the information in the retrieved screening filter, the entry corresponding to the origination element and the call destination for the call being processed is located, to determine the status for that call. Based upon the call status contained in the screening filter, the call is either allowed or denied, or constraints are imposed. If the call is allowed, switch 1301 or 1302 completes the call with the appropriate call treatment; if the call is denied, switch 1301 or 1302 may be instructed to play an announcement to advise the caller that the call cannot be completed.

The above invention, when properly designed, can provide significant protection against fraudulent calls in a virtual network. Many modifications and adaptations are also possible, so that the invention is to be limited only by the appended claims.

We claim:

1. A processor for generating screening information used to control the admission of calls to a customer's virtual private communications network, said processor including
    means for receiving (a) first information relating to historical communications traffic patterns for said customer, and (b) second information relating to fraudulent calls applied to said network, and
    means for generating said screening information as a joint function of said first and second information.

2. The invention defined in claim 1 wherein said processor further includes
    means for aggregating said first information based upon originating locations and destination locations for said traffic, and
    means for designing said communications network and for designating said originating and destination locations as on-net locations or off-net locations, the designing and designating each being a function of the aggregated information.

3. The invention defined in claim 2 wherein said processor further includes means for storing information indicative of fraudulent calls placed through said communications network to individual ones of said off-net locations, and wherein said generating means is responsive to information stored in said storing means for generating admit or deny indicators for calls placed to said individual locations.

4. A system for generating screening filters used in processing calls placed by users of a virtual communications network (VCN), said VCN having on-net and off-net locations, said system including
    means for storing telecommunications traffic information that is relevant for both the design of said VCN as well as for generation of said screening filters,
    means for aggregating said telecommunications traffic information in accordance with the locations at which said traffic originated,
    means for applying said aggregated traffic information both to a network design tool arranged to design said VCN as well as to a screening filter generator (SFG),
    means for applying, to said SFG, information from said network design tool indicative of the on-net and off-net locations in the VCN, and information from a data base that provides information indicative of the incidence of fraudulent calling to different destinations, and
    means in said SFG arranged to process said aggregated traffic information and said information from said network design tool together with information relating to VCN design parameters in order to generate screening filters that can determine, on a call by call basis, whether a call made using the VCN should be allowed or denied.

5. The invention defined in claim 4 wherein said telecommunications traffic information includes traffic data contained in network and customer premises equipment call detail records and billing data.

6. The invention defined in claim 4 wherein said VCN includes a plurality of origination elements grouped by station groups, code groups and ID groups, and each of said screening filters pertains to calls originating from one of said origination elements.

7. A system for generating screening filters used in processing calls placed by users of a virtual communications network (VCN), said VCN having on-net and off-net locations, said system including
    means for storing telecommunications traffic information,
    means responsive to said telecommunications traffic information for generating a design for said VCN, and means for generating said screening filters, said generating means being jointly responsive to (a) said telecommunications traffic information, and (b) information derived from said design for said VCN.

8. The invention defined in claim 7 wherein said generating means is further responsive to information indicative of the incidence of fraudulent calling to different destinations.

9. The invention defined in claim 8 wherein said information derived from said design includes information indicative of the on-net and off-net locations in said VCN.

10. A system for controlling telecommunications traffic in a virtual communications network (VCN) arranged to route calls from a plurality of originating locations to a plurality of destination locations, said VCN having on-net and off-net locations, said system including first means for storing data indicative of historical calling patterns for calls made between said originating and destination locations, said data being aggregated by originating locations and destination locations, second means for storing data indicative of the expected incidence of fraudulent calls placed to said destination locations, means responsive to the aggregated data for configuring said VCN, the configuration of said VCN including information defining the on-net status of said originating locations and said destination locations, and means for generating a plurality of screening tables, each of said screening tables indicative of the extent to which a user of said virtual communications network is allowed to place a call from one of said originating locations to each one of said destination locations, wherein the data in said screening tables is generated as a joint function of data in said first and second storing means.

11. Apparatus for generating filters used to determine the eligibility of users of a software defined network to place calls between originating locations and destination locations, said apparatus including first means for storing data indicative of historical patterns of calls placed between said originating locations and said destination locations, second means responsive to said data for designing characteristics of said software defined network, said characteristics including information relating to said originating and destination locations, and means for generating said filters jointly in response to said stored data and said characteristics.

12. A virtual communications network, comprising at least one switch for controlling the connection of calls from originating locations to destination locations, and means for controlling the operation of said switch, said controlling means including means for determining in response to predetermined call screening information the eligibility of a call originated at a particular one of said originating locations to be connected to a particular one of said destination locations through said network, CHARACTERIZED IN THAT said call screening information is a joint function of (a) first information relating to historical communications traffic patterns for a user of said network, and (b) second information relating to fraudulent calls applied to said network.

13. A call screening filter generator for use in a software defined network, said network including (a) switching means for connecting call origination locations to call destination locations, and (b) control means for supervising completion of calls connected via said switching means, wherein said screening filter generator includes (1) means for aggregating call detail records indicative of calling patterns for users of said software defined network, (2) means responsive to information describing calling patterns between said origination locations and said destination locations output from said aggregating means for generating configuration information used to design said network, and (3) means responsive jointly to said calling patterns and said configuration information for generating screening filters which supervise the completion of calls in said control means.

14. A method of generating screening information used to control the admission of calls to a customer's virtual communications network, said method including the steps of receiving (a) first information relating to historical communications traffic patterns for said customer, and (b) second information relating to fraudulent calls applied to said network, and generating said screening information as a joint function of said first and second information wherein said method further includes the steps of aggregating said first information based upon originating locations and destination locations for said traffic, and designing said communications network and designating said originating and destination locations as on-net locations or off-net locations, said designing and designating each being a function of the aggregated information.

15. The method defined in claim 14 wherein said method further includes the step of storing information indicative of fraudulent calls placed through said communications network to individual ones of said off-net locations, and wherein said generating step is performed responsive to information stored in said last storing step for generating admit or deny indicators for calls placed to said individual locations.

16. A method for generating screening filters used in processing calls placed by users of a virtual communications network (VCN), said VCN having on-net and off-net locations, said method including the steps of storing telecommunications traffic information that is relevant for both the design of said VCN as well as for generation of said screening filters, aggregating said telecommunications traffic information in accordance with the locations at which said traffic originated, applying said aggregated traffic information both to a network design tool arranged to design said VCN as well as to a screening filter generator (SFG), applying to said SFG information from said network design tool indicative of the on-net and off-net locations in the VCN, and information from a data base that provides information indicative of the incidence of fraudulent calling to different destinations, and processing information in said SFG together with information relating to VCN design parameters in order to generate screening filters that can determine, on a call by call basis, whether a call made using the VCN should be allowed or denied.

17. The method defined in claim 16 wherein said telecommunications traffic information includes traffic data contained in network and customer premises equipment call detail records and billing data.

18. The method defined in claim 16 wherein said VCN includes a plurality of origination elements grouped by station groups, code groups and ID groups, and each of said screening filters pertains to calls originating from one of said origination elements.

19. A method for generating screening filters used in processing calls placed by users of a virtual communications network (VCN), said VCN having on-net and off-net locations, said method including storing telecommunications traffic information, responsive to said telecommunications traffic information, generating a design for said VCN, and generating said screening filters, said generating step being jointly responsive to (a) said telecommunications traffic information and (b) information derived from said design for said VCN.

20. The method defined in claim 19 wherein said generating step further includes the step of generating a weighting factor indicative of the incidence of fraudulent calling to different domestic and international destinations.

21. The method defined in claim 20 wherein said information derived from said design includes information indicative of the on-net and off-net locations in said VCN.

22. A method for controlling telecommunications traffic in a virtual communications network arranged to route calls from a plurality of originating locations to a plurality of destination locations, said method including the steps of storing data indicative of historical calling patterns for calls made between said originating locations and said destination location, said data being aggregated by originating locations and destination locations, storing data indicative of the expected incidence of fraudulent calls placed to said destination locations, configuring said VCN, using said aggregated data, the configuration of said VCN including information defining the on-net status of said originating locations and said destination locations, and generating a plurality of screening tables, each of said screening tables indicative of the extent to which a user of said virtual communications network is allowed to place a call from one of said originating locations to each one of said destination locations, wherein the data in said screening tables is generated as a function of data in said first and second storing means.

23. A method for generating filters used to determine the eligibility of users of a software defined network to place calls between originating locations and destination locations, said method including the steps of storing data indicative of historical patterns of calls placed between said originating locations and said destination locations, responsive to data stored in said storing step, designing characteristics of said software defined network, said characteristics including information relating to said originating and destination locations, and generating said filters jointly in response to both said stored data and said characteristics.

24. A method for use in virtual communications network (VCN) which comprises at least one switch for controlling the connection of calls from originating locations to destination locations, said VCN having a design generated in response to a body of telecommunications traffic information, said method comprising the steps of making a determination, in response to a call initiated from a particular one of said originating locations to a particular one of said destination locations through said network and further in response to predetermined call screening information, as to whether said call should be completed or denied, and controlling the operation of said switch in accordance with said determination, characterized in that said call screening information is a joint function of (a) said telecommunications traffic information and (b) said design.

* * * * *